United States Patent
Bredl et al.

(10) Patent No.: US 10,254,493 B2
(45) Date of Patent: Apr. 9, 2019

(54) CABLE AND METHOD FOR PRODUCING THE CABLE

(71) Applicant: LEONI KABEL GMBH, Nuremberg (DE)

(72) Inventors: Johannes Bredl, Abenberg (DE); Volker Schramm, Roth (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 15/881,247

(22) Filed: Jan. 26, 2018

(65) Prior Publication Data

US 2018/0149822 A1 May 31, 2018

Related U.S. Application Data

(63) Continuation of application No. PCT/EP2016/068234, filed on Jul. 29, 2016.

(30) Foreign Application Priority Data

Aug. 5, 2015 (DE) ........................ 10 2015 214 889

(51) Int. Cl.
G02B 6/44 (2006.01)

(52) U.S. Cl.
CPC ........... *G02B 6/443* (2013.01); *G02B 6/4414* (2013.01); *G02B 6/4429* (2013.01); *G02B 6/4486* (2013.01); *G02B 6/4433* (2013.01); *G02B 6/4484* (2013.01)

(58) Field of Classification Search
CPC .... G02B 6/443; G02B 6/4486; G02B 6/4414; G02B 6/4429; G02B 6/4433; G02B 6/4484

See application file for complete search history.

(56) References Cited

U.S. PATENT DOCUMENTS

| | | | | | |
|---|---|---|---|---|---|
| 4,826,279 | A | * | 5/1989 | Nishimura | G02B 6/4407 385/102 |
| 5,163,116 | A | * | 11/1992 | Oestreich | G02B 6/4403 385/111 |
| 5,390,273 | A | * | 2/1995 | Rahman | G02B 6/4403 385/112 |
| 5,517,591 | A | * | 5/1996 | Wagman | G02B 6/4408 385/105 |

(Continued)

FOREIGN PATENT DOCUMENTS

| | | |
|---|---|---|
| DE | 19713063 A1 | 10/1998 |
| DE | 69720348 T2 | 3/2004 |

(Continued)

*Primary Examiner* — Ellen Kim
(74) *Attorney, Agent, or Firm* — Laurence A. Greenberg; Werner H. Stemer; Ralph E. Locher

(57) ABSTRACT

A cable includes a guide element and a signal line. The guide element extends flatly on a guide plane, and the signal line is guided along a winding path on the guide plane by the guide element. The signal line has multiple bends on the guide plane. In particular, the cable is suitable for use under high stretching loads by virtue of the winding course of the signal line. The cable is simultaneously particularly space-saving in that the line is guided solely within the guide plane. A method for producing the cable is also provided.

25 Claims, 1 Drawing Sheet

(56) References Cited

U.S. PATENT DOCUMENTS

| | | | | |
|---|---|---|---|---|
| 5,531,064 A * | 7/1996 | Sawano | ............... | G02B 6/4403 |
| | | | | 385/112 |
| 5,751,881 A * | 5/1998 | Konda | ................. | G02B 6/4408 |
| | | | | 385/103 |
| 6,052,502 A | 4/2000 | Coleman | | |
| 9,964,724 B2 * | 5/2018 | Baucom | ............... | G02B 6/4404 |
| 2010/0158455 A1 | 6/2010 | Griffioen | | |

FOREIGN PATENT DOCUMENTS

| | | |
|---|---|---|
| DE | 102012206330 A1 | 10/2013 |
| GB | 2482860 A | 2/2012 |
| JP | H08262288 A | 10/1996 |
| JP | H08339725 A | 12/1996 |
| WO | 2009054476 A1 | 4/2009 |
| WO | 2010109339 A1 | 9/2010 |

* cited by examiner

CABLE AND METHOD FOR PRODUCING THE CABLE

CROSS-REFERENCE TO RELATED APPLICATION

This application is a continuation, under 35 U.S.C. § 120, of copending International Application PCT/EP2016/068234, filed Jul. 29, 2016, which designated the United States; this application also claims the priority, under 35 U.S.C. § 119, of German Patent Application DE 10 2015 214 889.0, filed Aug. 5, 2015; the prior applications are herewith incorporated by reference in their entirety.

BACKGROUND OF THE INVENTION

Field of the Invention

The invention relates to a cable having a guide element and a signal line. Furthermore, the invention relates to a method for producing such a cable.

A cable with a signal line normally serves to transmit signals and the signal line has a number of signal wires for that purpose. There is often a danger of destroying or at least damaging the signal line, in which case the quality and reliability of the signal transmission as a whole is endangered, especially when using light-guiding elements for the transmission of signals, in the case of mechanical strain, for example stretching or bending the cable. In order to prevent such an occurrence, the signal line can be constructed as a bundle conductor, within which the signal wires are loosely disposed with excess length. In that way, a certain freedom of movement is then available to the signal wires.

As an alternative, the option exists to wind one or a plurality of bundle conductors in a helical shape around a central core or guide element in a plurality of turns. In the event of tensile stress, the turns of the bundle conductors are then pulled out of each other so that their distance from each other is increased and the radius of the turns is thus reduced. That also applies correspondingly to the signal wires led within the bundle conductors, which due to the loose configuration can change their position without themselves undergoing excessive mechanical strain. Due to the addition of length in the signal line related to that principle, such cables have an accordingly large diameter.

SUMMARY OF THE INVENTION

It is accordingly an object of the invention to provide a cable and a method for producing the cable, which overcome the hereinafore-mentioned disadvantages of the heretofore-known cables and methods of this general type, in which the cable has reduced space requirements and in which, furthermore, a signal line of the cable is effectively protected against strong levels of mechanical strain to the furthest extent possible, particularly against stretching.

With the foregoing and other objects in view there is provided, in accordance with the invention, a cable and a method of manufacturing the cable, in which the cable has a guide element as well as a signal line for the transmission of signals. The guide element extends within a guide level in a flat manner. The signal line in the guide level is led by the guide element, specifically along a winding path. The signal line therefore has a plurality of bends within the guide level. The guide element defines a guide control for the signal line. In the simplest case, a limited interior space is formed by the guide element, within which the signal line is loosely guided and is therefore freely movable.

Overall, with regard to the cable, the signal line is constructed with excess length to avoid stretching of the signal wires when the cable is strained, that is stretching of a signal wire within the signal line in particular, so that the signal line and, in particular, the signal wires are initially pulled straight instead of experiencing direct tensile stress. However, the excess length must be accordingly accommodated within the cable and then leads to a generally winding, non-straight course of the signal line relative to the cable. The signal line thus swerves almost transversely to a longitudinal direction of the cable. The invention is based on the concept of allowing the signal line to only swerve in one dimension in a controlled manner, that is a transverse direction. Thus, the advantage of a low space requirement arises so that the cable can be constructed in an overall compact manner, for example, with a flat cross section. While, in the case of a conventional spatial winding of the signal line, a dead space usually forms, for example, in a helix-shaped path in the center, a more efficient use of space occurs in the flat embodiment. The cable according to the invention thereby saves space, however it continues to provide sufficient extra length for the signal line in order to withstand a high level of tensile stress without damage.

The path is generally winding so that the signal line forms a plurality of bends along the path. Due to the flat construction of the guide element, all bends are within the guide level. The guide level is parallel to the longitudinal direction. The bends each have a bend radius, which is expediently selected with regard to a minimum bending radius of the signal line, for example roughly twice as large, in order to allow a sufficient level of bend. In order to make the mechanical properties of the cable along the longitudinal direction as homogeneous as possible, all bends are preferably constructed with the same bending radius.

In order to guide the signal line, the guide element has a guide contour in a preferred embodiment, which specifies the course of the path and therefore the course of the signal line. This thus abuts the guide contour, which can therefore also be referred to as an abutment contour. In an embodiment variant, the signal line is attached to the guide contour. A forced guidance for the signal line is provided by the guide contour, thereby providing a defined geometry for the path. In particular, in this way, it is ensured, for example, that the signal line does not go below a minimum bending radius. The guide contour defines a limited guide space. For this purpose, the guide contour has two opposite wall areas, which limit the guide space and the signal line is laid in between them. Expediently, in a cross section, the guide contour follows an outer contour of the signal line. Preferably, the cross section corresponds to the cross section of the signal line—up to a required level of tolerance—in order to provide for an optimum hold. The guide space has at least one width that corresponds to the width (diameter) of the signal line.

Preferably, the path has a meandering form, which results in an especially efficient use of space. The bends are then alternatively crimped on the right and left so that, in particular, a wave shape results along the path.

The cable as well as the guide element generally extend in a longitudinal direction and have a cross section transversely thereto. In a cross-sectional view, the guide element has a height as well as a width perpendicular thereto. Without loss of generality, the height is measured along a short axis of the guide element and the width is measured along a long axis. Due to the flat construction of the guide element, the width is then greater than the height. For example, the cross section of the guide element corresponds to an ellipse or a rectangle and the width and height then correspond to main axes and edge lengths of the cross section.

In an especially space-saving embodiment, the height of the guide element approximately corresponds to a diameter of the signal line and the width of the guide element is greater than the diameter. In other words: the guide element is constructed to be flat in such a way that its size in one dimension, namely perpendicular to the guide level, is adapted to the diameter of the signal line and thus the height is minimized. The term "approximately," in particular, is understood to mean that the height of the guide element differs no more than 25% from the diameter of the signal line.

The width is chosen to be correspondingly greater than the height to provide sufficient space for the bends of the signal line. The width is preferably at least twice as large, preferably at least five times as large as the diameter of the signal line and, in particular, twenty times as large at the most. The lower limit is mainly given by the extra length of the signal line, which is required for the realization of a particular stretch of the cable. For example, in the case of a standardized tensile test, the cable should tolerate a change in length of up to 2% without suffering a loss of function. The signal line is then constructed with a corresponding extra length of approximately 2% or more so that stretching the cable by this value does not lead to an excessive tensile stress of the signal line. In contrast, the upper limit is primarily limited by the minimum permissible bending radius of the signal line and, in particular, by a movement space of the signal wire within the signal line, in other words a free interior space within the signal line.

Preferably, the guide element has a sheathing, within which the signal line is led. The sheathing is tube or hose-shaped and encloses an interior space, in which the signal line is disposed. Therefore, the sheathing forms a covering, inside of which the signal line is disposed. In accordance with the flat construction, the sheathing is also constructed to be flat. The distance between an upper side and an underside of the sheathing preferably corresponds to the height of the signal line. For example, the sheathing is extruded or laminated. The sheathing is, in particular, made of a plastic, for example PE or PVC. The sheathing is preferably an outer casing of the cable.

In a suitable variant, the sheathing serves to directly guide the signal line. For example, it is conceivable to provide the sheathing with an appropriate, wound inner contour, which forms the guide contour to determine the path and therefore to guide the signal line.

In an especially preferred variant, the guide element, in addition or as an alternative to the sheathing, has a number of molded parts, meaning one or a plurality of molded parts, that form the contour, which specifies the path. In this way, an especially precise and controlled guide of the signal line is ensured. The signal line then abuts the molded parts and follows the specified path in this way, in an especially precise manner. In contrast to loose guidance of the signal line, an especially defined guidance thus takes place, which, in particular, also ensures an especially homogeneous configuration of the signal line. In particular, there is another advantage to this, which is that going below a minimum bending radius of the signal line is avoided by using the molded parts.

Preferably, at least two opposite molded parts are provided as flat units. Each molded part limits a side of the guide contour with a first (inner) edge side. Preferably, the one second (outer) edge side, which is opposite the first edge side, thereby exhibits a different contour from the first (meandering or bent) edge side, in particular, the second edge side runs in a straight line.

The at least two opposite molded parts are generally preferably constructed as prefabricated intrinsic units that define the guide contour when interacting.

Alternatively, the guide contour is constructed, for example, as a groove-like, wound recess in at least one plate-shaped form component. Its outer edge sides also preferably have a course diverging from the course of the guide contour, in particular a linear course.

The molded parts are expediently made of an elastic material in order to be appropriately malleable when stretching the cable and to make a certain level of length change possible. In particular, the molded parts can be stretched by approximately 1 to 10% in the longitudinal direction. This stretch ability in length generally applies to the guide contour. Suitably, the molded parts are made of a plastic, particularly polyurethane, polyethylene or polyvinyl chloride. Polyurethane is particularly suitable, since it is permanently elastic and is available in a particularly wide range of elasticity.

Suitably, a plurality of molded parts is disposed in a row in the longitudinal direction of the cable so that a cable of any length can be manufactured simply by using a corresponding number of molded parts. Thereby, the molded parts each form as it were individual components, which form the guide contour when put together, which specifies the path for the signal line. Thereby, the molded parts each have a partial contour, which is bent accordingly and respectively defines a partial section of the guide contour.

The molded parts are generally plate-shaped and thereby flat individual elements. In accordance with a first variant, the partial contour is formed by a recess in a respective individual element.

In an especially suitable embodiment, the molded parts are not only disposed in a row, but organized in a plurality of groups, in particular in two groups, which respectively extend in a longitudinal direction. However, they are disposed on different sides of the signal line and then surround them, as it were. In this way, the outer impression of the cable is not distinguished by the winding path, but by the specific embodiment of the molded parts.

In this preferred alternative, a respective section of the guide contour is defined by two molded parts that are opposite to each other and form the guide contour between them. Each of the oppositely disposed molded parts therefore has a wall area of the guide contour. In an expedient variant, the two molded parts that are opposite each other have one or each have one shaping. This serves, in particular, as a spacer to set a specified distance between the two molded parts and to secure the guide contour and/or as a lock to prevent a relative longitudinal displacement of the two molded parts.

The edge side of the individual elements, which is oriented toward the guide contour, is constructed to be bent. The opposite edge side is preferably constructed to be linear. Altogether, the individual molded parts form a generally plate-shaped flat and, in particular, linearly extending overall molded part with the integrated guide contour.

Generally, therefore, the outer shape of the cable, in other words in particular the cross section along the cable, can also be constructed in almost any way and in an advantageous manner independently of the path by using the molded parts. In a preferred embodiment, the cable has a smooth outside, meaning the cross section has an outer contour, which is constant along the cable. The signal line is then virtually surrounded by the molded parts and does not contribute to the outer contour.

In order to make manufacturing of the cable in particular easier, the molded parts are expediently constructed as identical parts, meaning, in particular, that they are formed identically to each other. The molded parts are then preferably manufactured in an especially cost-efficient manner as semi-finished products, in particular in greater quantities, for example, as injection-molded parts. Thereby, opposite molded points are preferably disposed offset to each other in the longitudinal direction, in particular around their half-length. A periodic structure of any length is then formed by lining up a plurality of molded parts in a row, to which the signal line is led and aligned. In this way, then, a favorable continuous production of the cable is possible.

In a preferred further embodiment, a respective molded part has a coupling element, through the use of which the respective molded part is connected to a subsequent molded part. By connecting the molded parts among each other, the guide element is especially robust and an unintended slipping of the molded parts against each other in the cable is prevented as well as its deformation. In a first variant, the coupling element is a separate connection part, for example a pin, a bolt, or a dowel, which is used in corresponding holes of the molded parts, in particular in an exactly fitting manner. In a second variant, the coupling element is permanently attached to one of the molded parts or molded onto it as a single piece, for example as a protruding coupling contour, a lug, hook or nib, which then engages into a suitable, in particular a complementary recess on the subsequent molded part or is inserted into such. Generally, a plurality of reversible and irreversible coupling mechanisms come into consideration, for example plug connections, press fits, undercuts, snap couplings or snap-in connections.

In an expedient embodiment, the at least one molded part and preferably the plurality of molded parts—together with other elements if applicable—is disposed within an interior space defined by the sheathing. Preferably, the at least one molded part completely fills the interior space, possibly along with the other (filling) elements, up to the guide contour and up to the signal line. As a whole, this results in a mechanically stable structure. Thereby, the at least one molded part or the plurality of molded parts lie loosely as at least one prefabricated component within the interior space defined by the sheathing for example.

In particular, the sheathing therefore forms one or also two limiting sides for the guide contour depending on if the guide contour is open to one or to two (opposite) sides due to the at least one molded part.

In an advantageous variant, the guide element merely has one, in particular, long molded part instead of a plurality of molded parts disposed in a row in a longitudinal direction. In other words: the guide element has a molded part with a length that roughly corresponds to the length of the cable. In this embodiment, putting together a plurality of molded parts is dispensed with, whereby, in particular, manufacturing the cable is carried out in a more efficient manner. Instead, the molded part is provided as a continuous element or at least with one of the lengths that corresponds to the length of the cable. In other words: the molded part is seamless along the cable.

Thereby, a corresponding formation of a plurality of molded parts that extend over the entire length of the cable in a longitudinal direction, which are then added during the manufacture of the cable, in particular, at the same time and expediently also in parallel, is principally conceivable. In order to limit the path, in particular, two seamless molded parts are disposed next to each other without encroaching on the path in this embodiment variant.

The long molded part is, in particular, produced in an upstream manufacturing process and then supplied to the manufacturing process of the cable. For example, the molded part is an extruded component. Alternatively, the molded part is initially a solid component, at which, before or during the manufacturing of the cable, the guide contour is formed according to the requirements. In a further embodiment, only a single seamless molded part is used, in which the path is formed. For example, a plate-shaped molded part of a milling machine, for example a CNC milling machine is added and the guide contour is milled. In a suitable embodiment, the guide contour is then a milled groove, into which the signal line is subsequently laid or drawn.

During the manufacturing process of the cable, the signal line is preferably provided as a semi-finished product, which is subsequently put together with the guide element to form the cable. Preferably, the signal line is round so that, in particular, conventional signal lines can also be used to manufacture the cable. Due to the principle-related rotational symmetry of a round, meaning circular signal line in a cross section, in contrast to rectangular cross-sections for example, it is possible to do without an alignment of the cross section of the signal line in relation to the cable during the manufacturing process, whereby manufacturing the cable is simplified accordingly.

In a suitable embodiment, the signal line has at least one light-guiding element and is therefore constructed as a fiber optic signal line in particular. For example, the light-guiding element is a glass fiber or a polymer-optic fiber, in short, POF. The light-guiding element is constructed, in particular, for data transmission. In a variant, the signal line has a plurality of light-guiding elements. In another variant, the signal line only has light-guiding elements as signal wires.

In a variant, the light-guiding element is constructed as a sensor element and the cable is then a sensor cable in particular. The sensor element is then preferably composed of environmental parameters for spatially-resolved measurement in particular, for example, to measure a temperature or pressure or to measure sound waves. The environmental parameter is then advantageously measured over the entire length of the cable.

In a preferred embodiment, the signal line is a bundle conductor with an outer tube and at least one signal wire which runs within the outer tube. Thereby, the signal wires are constructed as light-guiding elements for example, as described above. The outer tube encloses the signal wires and, in particular, has an inner diameter that is greater than an overall diameter of the signal wires so that a certain level of movement room is available. When stretching or bending the cable, the signal wires in the outer tube can then change their position and avoid possible mechanical strain accordingly.

In a preferred embodiment, a suitable positioning of the signal wires within the outer tube takes place by filling the outer tube with air, a liquid or a thixotropic gel. The signal wires are then surrounded by a medium, in which each wire can then move within the course of a length change.

In a suitable embodiment, the bundle conductors additionally have a strain relief and/or cable sheathing, which also surrounds the signal wires. Preferably, the strain relief surrounds the outer tube and the cable sheathing surrounds the strain relief and is thus disposed as an outer layer of the bundle conductors. The strain relief is, for example, a fiber network or wire mesh made of steel or aramid.

In order to protect the cable against excessive strain in particular, the guide element has at least one strain relief element in an advantageous embodiment, wherein the signal line and the strain relief element measured perpendicular to the guide level have approximately the same thickness. Due to the additional strain relief element, the signal line, in particular, is further relieved. Suitably, the material selection and dimensioning of the strain relief element is carried out in such a way that the cable has a certain tensile modulus, which lies within the range of cable stretching that is permissible for the cable, in particular, taking the planned use of the cable into consideration. Since the strain relief element and the signal line have approximately the same thickness, in addition, an especially compact construction of the cable, especially in the direction of the short axis, is furthermore ensured. The strain relief element is, for example, a wire, a cord, a yarn, or a fiber or a composite made of a plurality of wires, cords, yarns or fibers and preferably is manufactured from an elastic metal or plastic with suitable strength and stretching properties.

In an especially preferred embodiment, the guide element has two strain relief elements, which encompass the signal line on the side and define the guide level, within which the signal line runs in a winding manner. The strain relief elements thereby run within the guide level and are disposed along the long axis within the cross section of the cable. The signal line is disposed between the strain relief elements, which thereby runs in a winding manner accordingly, while the strain relief elements primarily run in a straight manner, thereby ensuring a homogenous cross section of the cable.

In a further embodiment with molded parts, they are suitably disposed within the cross section between the strain relief elements and the signal line and completely fill corresponding intermediate spaces, in particular, so that the cable has an especially simple outer contour as a whole and is held together in an especially robust manner in the interior space. In the case of a round embodiment of the strain relief elements and the signal wires, in particular, the molded parts then have suitably concave recesses at the side, respectively, in which the strain relief elements and the signal wires are in particular interlocked. In this way, in particular, the signal wire is completely surrounded on both sides by molded parts. Thereby, in the direction of the short axis of the cable, the molded parts themselves each have a height which corresponds to the diameter of the signal line so that the cable has a smooth outer surface.

In a suitable further embodiment, attached to the configuration made up of a signal wire, strain relief elements and molded parts is a sheathing which surrounds this entire configuration and, in particular as the outer casing of the cable, protects the cable from environmental factors. For example, the sheathing is extruded or laminated. The sheathing has a sheathing thickness, that is in particular approximately 0.05 to 1 mm or, in one variant, more than 1 mm.

Preferably, the cable is only composed of the guide element and the signal line and otherwise has no other components. Depending on the embodiment, the guide element is then in particular composed of the molded parts and/or a sheathing of the cable as well as, in an alternative, one or a plurality of additional strain relief elements.

In order to manufacture the cable, a guide level is specified by a flat guide element as well as a winding path, along which a signal line is led, wherein a plurality of bends of the signal line are formed within the guide level.

In a preferred further embodiment, the guide element is formed by a number of molded parts, which are disposed in a row in a longitudinal direction. To this end, initially, a plurality of molded parts is provided and disposed in a row so that the path is specified by forming a guide contour, at which the signal line is subsequently laid. In addition, or as an alternative, two groups of molded parts are formed, wherein both groups enclose the signal line on the side and, in particular, hold it in an interlocking manner.

Advantageously, after putting together the molded parts and the signal line, a sheathing is attached to the entire configuration, for example extruded or laminated so that the entire configuration is enclosed by the sheathing. Thereby, the sheathing is constructed as an outer casing in particular.

Other features which are considered as characteristic for the invention are set forth in the appended claims.

Although the invention is illustrated and described herein as embodied in a cable and a method for producing the cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
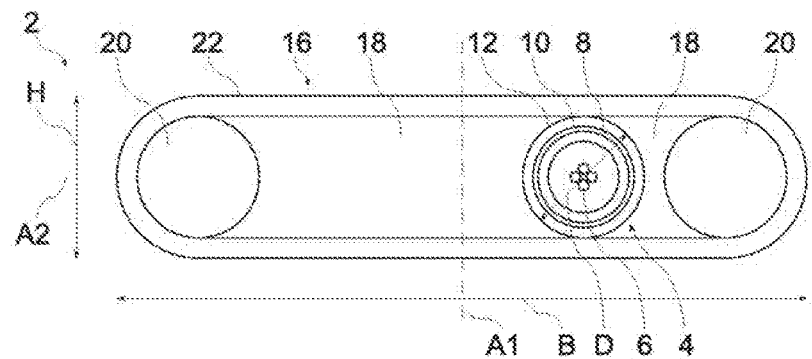
FIG. 1 is a diagrammatic, cross-sectional view of a cable.

Referring now to the figures of the drawings in detail and first, particularly, to FIG. 1 thereof, there is seen a cable 2 that is constructed for signal transmission and has a signal line 4 for this purpose. In this case, the signal line 4 is constructed as so-called bundle conductors and includes a number of signal wires 6, which are constructed in this case as light-guiding elements. These signal wires 6 are led within an outer tube 8 which, in the exemplary embodiment shown herein, is additionally encompassed by a strain relief 10 as well as a cable sheathing 12. The signal wires 6 are loosely led through the outer tube 8, which means an intermediate space exists between the outer tube 8 and the signal wires 6 which is, in particular, filled with air, a liquid or a thixotropic gel.

Figure 2:
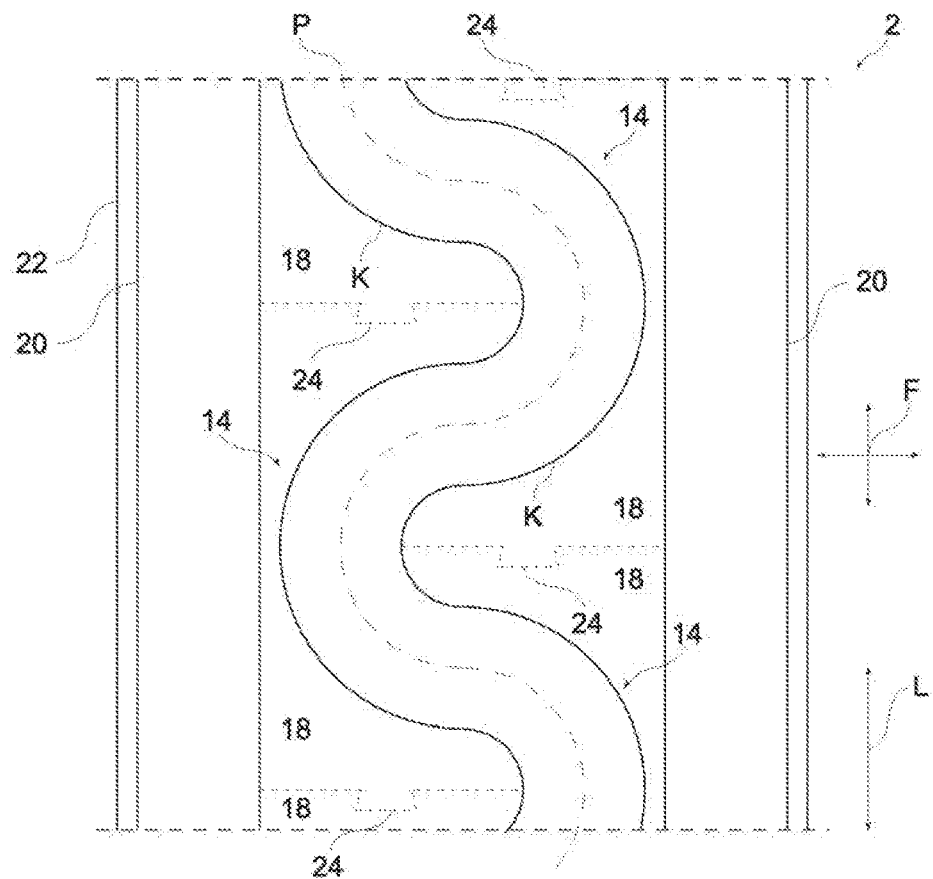
FIG. 2 is a fragmentary, longitudinal-sectional view of the cable.

As can be clearly seen particularly from FIG. 2, the signal line 4 follows a winding path P, which runs along the cable 2 in particular in a meandering manner. Thereby, the signal line 4 has a plurality of bends 14 that are alternately crimped on the right and left. Thus, the signal line 4 is only bent at a level, that is specified as a guide level F of a guide element 16 of the cable 2. This guide element 16 is constructed to be flat in its entirety and defines the guide level F in a way which corresponds to the drawing level in FIG. 2. The path P now lies within this guide level F so that the signal line 4 only extends along that level and the cable 2 obtains a particularly flat construction overall.

The flat construction is particularly evident in FIG. 1, which shows the cable 2 in a cross section. It is clearly evident that the cable 2 has a height H along a short axis A1 which is less than a width B of the cable along a long axis A2, which runs perpendicular to the short axis A1. In the exemplary embodiment shown herein, the width B is roughly five times a diameter D of the signal line 4, which is constructed in this case to be round. In contrast, the height H approximately corresponds to the diameter D, meaning it is approximately the same size.

In the exemplary embodiment shown herein, the guide element 16 is composed of a number of molded parts 18, a number of strain relief elements 20 as well as a sheathing 22, which is at the same time an outer casing of the cable 2. The strain relief elements 20 are, for example constructed as steel cables or are aramid fibers and primarily run straight in a longitudinal direction L of the cable 2. Thereby, the strain relief elements 20 are also within the guide level F. The signal line 6 runs between the two strain relief elements 20. The remaining intermediate spaces are filled in by the molded parts 18. Thereby, each molded part 18 has a contour. The assembled molded parts 18 then form together a guide contour K, which specifies the path P and at which the signal line 4 is laid. Thereby, in particular, the signal line 4 is led along the bent-structured edge sides of the molded parts 18.

The molded parts 18 are constructed as identical parts so that they form a periodic structure when disposed in a row. In the exemplary embodiment shown herein, the molded parts 18 in particular are constructed to be approximately U-shaped, which is particularly evident from FIG. 2. The molded parts 18 generally have at least one convex as well as one concave section of the edge side. In the U-shaped embodiment, the middle is formed by a concave section at which a respective outer convex section joins. The convex sections align with the convex sections of the adjacent molded parts 18.

It is also clear from FIG. 2 that the molded parts 18 are organized in two groups, which respectively extend in the longitudinal direction L, wherein the two groups encompass the signal line 4 on the side. The respective molded parts 18 are then disposed in a row in the longitudinal direction L of the cable 2 within a group.

In addition, two consecutive molded parts 18 are connected to each other through a coupling element 24, which is constructed as a lug in the illustrated exemplary embodiment. The lug is inserted into a recess complementary to the lug of the subsequent molded part 18.

The sheathing 22 is attached to the entire configuration composed of a signal line 4, molded parts 18 and strain relief elements 20, in particular, the sheathing 22 is extruded and defines an outer contour of the cable 2, that roughly corresponds to a rectangle as is evident from FIG. 1, where the short sides are constructed to be rounded. As a whole, the cable 2 is thus constructed to be especially flat. However, the cable 2 can be subjected to a high level of strain without risk, since a sufficient excess length of the signal line 4 has been implemented due to the winding course of the signal line 4 within the guide level F.

The following is a summary list of reference numerals and the corresponding structure used in the above description of the invention.

REFERENCE LIST

2 Cable
4 Signal line
6 Signal wire
8 Outer tube
10 Strain relief
12 Line sheathing
14 Bend
16 Guide element
18 Molded part
20 Strain relief element
22 Sheathing
24 Coupling element
A1 short axis
A2 long axis
B Width
D Diameter
F Guide level
H Height
K Contour
L Longitudinal direction
P Path

The invention claimed is:

1. A cable, comprising:
a guide element extended within a guide level in a flat manner; and
a signal line disposed in said guide element at said guide level, said signal line being led along a winding path by said guide element and said signal line having a plurality of bends within said guide level;
said guide element having a guide contour determining a course of said winding path at which said signal line is led and providing a forced guidance for said signal line; and
said guide element having a plurality of molded parts forming said guide contour.

2. The cable according to claim 1, wherein said path has a meandering shape.

3. The cable according to claim 1, which further comprises a cross section of the cable in which:
said guide element has a height and a width perpendicular to said height;
said signal line has a diameter;
said height approximately corresponds to said diameter; and
said width is greater than said diameter.

4. The cable according to claim 3, wherein said width is at least twice as large as said diameter.

5. The cable according to claim 1, wherein said guide element has a sheathing, and said signal line is led within said sheathing.

6. The cable according to claim 1, wherein the cable extends in a longitudinal direction, and a plurality of said molded parts are disposed in a row in said longitudinal direction.

7. The cable according to claim 1, wherein said molded parts are constructed as identical parts.

8. The cable according to claim 1, wherein each molded part has a respective coupling element for connecting said molded part to a respective subsequent molded part.

9. The cable according to claim 1, wherein said guide element has a sheathing, said signal line is led within said sheathing, and said molded parts completely fill an interior space defined by said sheathing up to said guide contour.

10. The cable according to claim 1, wherein the cable has a length, and said guide element has a molded part with a length approximately corresponding to said length of the cable.

11. The cable according to claim 1, wherein said signal line is round.

12. The cable according to claim 1, wherein said signal line has at least one signal wire constructed as a light-guiding element.

13. The cable according to claim 1, wherein said signal line is a bundle conductor having an outer tube and a plurality of signal wires running within said outer tube.

14. The cable according to claim 13, wherein said outer tube is filled with air, a liquid or a thixotropic gel.

15. The cable according to claim 1, wherein said guide element has at least one strain relief element, and said signal line and said at least one strain relief element have an approximately identical thickness measured perpendicularly to said guide level.

16. The cable according to claim 1, wherein said guide element has two strain relief elements encompassing said signal line laterally and defining said guide level, and said signal line runs within said guide level in a winding manner.

17. The cable according to claim 1, wherein the cable includes only said guide element and said signal line.

18. A method for manufacturing a cable, the method comprising the following steps:
   using a flat guide element to define a guide level;
   using the guide element to guide the signal line along a winding path in the guide element; and
   providing the signal line with a plurality of bends within the guide level;
   providing the guide element with a guide contour determining a course of the winding path along which the signal line is guided and providing a forced guidance for the signal line; and
   providing the guide element with a plurality of molded parts forming the guide contour.

19. The method according to claim 18, which further comprises placing the molded parts in a row in a longitudinal direction of the cable.

20. The method according to claim 18, which further comprises:
   providing the cable with a finished cable length;
   using a molded part to form the guide element; and
   providing the molded part as a continuous product or at least with a length corresponding to the finished cable length.

21. The method according to claim 20, which further comprises providing the molded part as a solid semi-finished product, and introducing a guide contour into the molded part to specify the path.

22. The cable according to claim 1, wherein said molded parts are formed of an elastic material permitting a change in length upon stretching the cable.

23. The cable according to claim 1, wherein said guide contour has a cross section following an outer contour of said signal line.

24. The method according to claim 18, which further comprises forming the molded parts from an elastic material permitting a change in length upon stretching the cable.

25. The method according to claim 18, which further comprises causing a cross section of the guide contour to follow an outer contour of the signal line.

* * * * *